United States Patent
Bhangu et al.

(10) Patent No.: US 12,316,494 B2
(45) Date of Patent: May 27, 2025

(54) SYSTEM AND METHOD FOR OPTIMIZING THE SCHEDULING OF O-CLOUD NODES IN A TELECOMMUNICATIONS NETWORK

(71) Applicant: RAKUTEN SYMPHONY, INC., Tokyo (JP)

(72) Inventors: Manmeet Bhangu, Indore (IN); Jyoti Bose, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/023,404

(22) PCT Filed: Jan. 31, 2023

(86) PCT No.: PCT/US2023/011923
§ 371 (c)(1),
(2) Date: Feb. 27, 2023

(87) PCT Pub. No.: WO2024/118108
PCT Pub. Date: Jun. 6, 2024

(65) Prior Publication Data
US 2025/0080415 A1    Mar. 6, 2025

(30) Foreign Application Priority Data
Nov. 29, 2022 (IN) .............................. 202221068792

(51) Int. Cl.
*H04W 24/10* (2009.01)
*H04L 41/0816* (2022.01)
(Continued)

(52) U.S. Cl.
CPC ...... *H04L 41/0816* (2013.01); *H04L 41/0895* (2022.05); *H04L 41/16* (2013.01)

(58) Field of Classification Search
CPC .. H04L 41/0816; H04L 41/0895; H04L 41/16
See application file for complete search history.

(56) References Cited

U.S. PATENT DOCUMENTS

2015/0326535 A1* 11/2015 Rao ...................... H04L 41/5054
726/15
2019/0379728 A1* 12/2019 Hellstrom ............... H04L 43/16
(Continued)

OTHER PUBLICATIONS

Written Opinion dated May 26, 2023 in International Application No. PCT/US2023/011923.
(Continued)

*Primary Examiner* — Gil H. Lee
*Assistant Examiner* — Juan C Turriate Gastulo
(74) *Attorney, Agent, or Firm* — Sughrue Mion, PLLC

(57) ABSTRACT

A method for optimizing the scheduling of an O-Cloud node, the method includes: determining a NF hosted on a O-Cloud node to be migrated to another O-Cloud nodes; sending a recommendation to the SMO to migrate the determined NF; sending instructions to implement the migration of the NF via an O2 interface to an O-Cloud management service; controlling the implementation of the migration of the determined NF to the other O-Cloud nodes; upon implementation of the migration, sending a confirmation notice to the SMO via the O2 interface; wherein the determining the one or more network functions NFs to be migrated, includes: obtaining data referring to historical and/or current utilization patterns of a O-Cloud node and/or a NF hosted thereon; inputting the data to an AI/ML model; obtaining a prediction of a utilization scenario; and determining a migration recommendation for the NF.

20 Claims, 8 Drawing Sheets

(51) Int. Cl.
*H04L 41/0895* (2022.01)
*H04L 41/16* (2022.01)

(56) References Cited

U.S. PATENT DOCUMENTS

| | | | |
|---|---|---|---|
| 2021/0184989 A1* | 6/2021 | Wu | H04L 47/822 |
| 2022/0014963 A1* | 1/2022 | Yeh | G06N 3/045 |
| 2022/0052915 A1* | 2/2022 | Estevez | H04L 67/1031 |
| 2024/0015561 A1* | 1/2024 | Atawia | H04W 28/0831 |

OTHER PUBLICATIONS

International Search Report dated May 26, 2023 in International Application No. PCT/US2023/011923.

\* cited by examiner

SYSTEM AND METHOD FOR OPTIMIZING THE SCHEDULING OF O-CLOUD NODES IN A TELECOMMUNICATIONS NETWORK

CROSS-REFERENCE TO RELATED APPLICATION(S)

This application is National Stage of International Application No. PCT/US2023/011923 filed Jan. 31, 2023 and is based on and claims priority from Indian Provisional Patent Application No. 202221068792, filed at the Indian Patent Office on Nov. 29, 2022, the disclosure of which is incorporated by reference herein in its entirety.

TECHNICAL FIELD

Systems and methods consistent with example embodiments of the present disclosure relate to providing a procedure for optimizing the scheduling of one or more open cloud (O-Cloud) nodes within an O-Cloud infrastructure of a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps. The functionalities include: providing policy (i.e., a set of rules that are used to manage and control the changing and/or maintaining of the state of one or more managed objects) based on guidance and enrichment across the A1 interface, which is the interface that enables the communication between the NRT-RIC and the nRT-RIC; performing data analytics; Artificial Intelligence/Machine Learning (AI/ML) training and inference for RAN optimization; and/or recommending configuration management actions over the O1 interface for managing the operation and maintenance (OAM), which is the interface that connects the SMO to RAN managed elements (e.g., nRT-RIC, O-RAN Centralized Unit (O-CU), O-RAN Distributed Unit (O-DU), etc.). The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (i.e., network functions such as O-CU-CP, O-CU-UP, O-DU, and O-eNB) via policies, wherein the O-DU connects to the O-RU over the FrontHaul including a Control User Synchronization (CUS) plane and the Management (M) plane. For example, the nRT sets policy parameters on activated functions of the E2 nodes. Further, the nRT-RIC hosts xApps to implement functions such as quality of service (QOS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning (AI/ML) models enforced and used by the nRT-RIC for RAN optimization, and the nRT returns policy feedback (i.e., how the policy set by the NRT-RIC works).

The SMO framework, within which the NRT-RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and/or could native network functions (CNF) and container (i.e., instance) based VNF and/or CNF. The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO interacts with O-Cloud management services such as, for example, infrastructure management services (IMS) and deployment management services (DMS) that are provided by O-Cloud, wherein the IMS provides functions that are responsible for the deployment and management of cloud infrastructures (i.e., the IMS orchestrates the O-Cloud infrastructure) and wherein the DMS provides functions responsible for the management of virtualized/containerized deployments on the O-Cloud infrastructure (i.e., the DMS orchestrates the virtualized/containerized deployments of the E2 nodes applications).

Moreover, according to the related art, during the operation of the O-RAN architecture, after an instantiation of E2 nodes (i.e., a virtualized/containerized deployment of the network functions (NFs) such as VNF and/or CNF) to the O-Cloud infrastructure (i.e., a deployment to one or more O-Cloud nodes), the NFs (i.e., a VNF and/or CNF) and/or the O-Cloud nodes (i.e., physical hosts such as servers or server clusters of the O-Cloud infrastructure) that are hosting one or more NFs may suffer abnormalities such as, for example, performance degradation over time and/or at topographic locations within the O-RAN.

These abnormalities may be caused by the fact that each application (i.e., one or more NFs (i.e., VNF and/or CNF)

hosted on one or more O-Cloud nodes) and its workload requirements on the O-Cloud infrastructure are unique with regard to the change over time and/or location of the O-Cloud nodes within the topology of the O-RAN. Thus, the anomalies based on the individual requirements may lead to a state where one or more O-Cloud nodes are no longer able to respond correctly to the current state of the O-Cloud infrastructure on which the applications (e.g., the one or more NFs) are orchestrated.

Referring to FIG. 1, the SMO (i.e., the NFO) schedules one or more O-Cloud nodes within the O-Cloud infrastructure according to the O-RAN architecture of the related prior art, as set forth above. The scheduling refers to selecting one or more O-cloud nodes that are suitable to perform a particular workload (i.e., to host one or more NFs such as VNF and/or CNF), where an O-Cloud node in accordance with the related art is defined as suitable if certain resources are not explicitly claimed (i.e., its suitability depends on the remaining unused hardware resources of the O-Cloud node). For example, the FOCMO and/or the NFO may control the scheduling (migration), whereas the implementation may be applied by the IMS and/or DMS to one or more NFs and/or one or more O-Cloud nodes, respectively. To this end, the scheduling of O-Cloud nodes according to the related art is focused on discrete pre-defined hardware resources of the O-Cloud infrastructure.

As a result, the scheduling by the NFO according to the related art is based on discrete predefined hardware resources of one or more O-Cloud nodes and may result in ineffective utilization and reduced performance of one or more NFs and/or O-Cloud nodes hosting the one or more NFs.

SUMMARY

According to embodiments, systems and methods are provided for optimizing the scheduling of one or more O-Cloud nodes within an O-Cloud infrastructure of a telecommunications network, wherein the scheduling of the one or more O-Cloud nodes is based on collecting historical and/or current data referring to utilization patterns of at least one O-Cloud node and/or one or more NFs hosted thereon (e.g., data referring to utilization patterns may include O-RAN Key performance indicators (KPIs), O-Cloud Key performance indicators (KPIs), O-RAN related and/or O-Cloud related telemetry data (e.g., O1 interface and/or O2 interface telemetry data) of at least one O-Cloud node and/or one or more NFs (e.g., VNF and/or CNF) hosted thereon, etc.). In particular, the systems and methods provide a recommendation (i.e., provide a decision) for migration (i.e., relocation) of one or more NFs to one or more other O-Cloud nodes by a rApp within the SMO framework.

To this end, the SMO framework (i.e., the rApp) uses historical and/or current data referring to utilization patterns of at least one O-Cloud node and/or one or more NFs hosted thereon (e.g., the rApp may subscribe to telemetric data services such as O1-related services, O2-related services, etc.) as input data for at least one artificial intelligence/machine learning (AI/ML) model. The SMO framework (i.e., the rApp) trains the AI/ML model by reinforcement learning to optimize the scheduling of at least one O-Cloud node (e.g., the AI/ML model, based on the input data is trained to predict performance anomalies of least one O-Cloud node and/or one or more NFs hosted thereon (e.g., future workloads, traffic, high power consumption, performance degradation, etc.) proactively (before it is occurrence).

As a result, based on the AI/ML model prediction, the systems and methods allow the rApp to provide a recommendation (i.e., an informed migration decision) which enables the SMO (i.e., NFO) to schedule (i.e., to select) resources of the O-Cloud infrastructure in an energy-efficient, O-Cloud resource optimized manner without any performance degradation of the NFs and/or the O-Cloud nodes and thereby allow for an efficient (e.g., energy-efficient, resource optimized, etc.) operation performance of the O-RAN.

Furthermore, the systems and methods, based on the AI/ML model predicted recommendation as set forth above, allow a balanced resource utilization of the O-Cloud infrastructure. Moreover, the systems and methods, based on the AI/ML model predicted recommendation as set forth above, allow to predict system anomalies in the O-RAN, to reduce incident reporting due to resource related alarms (e.g., minimize human interaction (e.g., of an O-Cloud maintainer)) and to improve the resiliency of O-RAN operations.

According to an embodiment, a system for optimizing the scheduling of one or more open cloud (O-Cloud) nodes within an O-Cloud infrastructure of a telecommunications network, the system includes: at least one memory storing instructions; and at least one processor configured to execute the instructions to: determine, by a rApp within a service management orchestration framework (SMO), one or more network functions (NFs) hosted on at least one O-Cloud node to be migrated to one or more other O-Cloud nodes; send, by the rApp, a recommendation to the SMO to migrate the determined one or more NFs; send, by the SMO, instructions to implement the migration of the determined one or more NFs via an O2 interface to at least one O-Cloud management service; control, by the SMO, the implementation of the migration for each of the determined one or more NFs to the one or more other O-Cloud nodes; upon implementation of the migration, send, by the at least one O-Cloud management service, a confirmation notice of the migration implementation to the SMO via the O2 interface; wherein in determining the one or more network functions NFs to be migrated, the at least one processor is configured to execute the instructions: obtain, by the rApp, data referring to historical and/or current utilization patterns of at least one O-Cloud node and/or one or more NFs hosted thereon; input, by the rApp, the data referring to historical and/or current utilization patterns of the at least one O-Cloud node and/or the one or more NFs hosted thereon to an artificial intelligence/machine learning (AI/ML) model; obtain, by the rApp, a prediction of at least one utilization scenario for the at least one O-Cloud node and/or the one or more NFs hosted thereon; and determine, by the rApp, based on the prediction of the at least one utilization scenario, a migration recommendation for the one or more NFs hosted on the at least one O-Cloud node.

According to an embodiment, a method for optimizing the scheduling of one or more open cloud (O-Cloud) nodes within an O-Cloud infrastructure of a telecommunications network, the method includes: determining, by a rApp within a service management orchestration framework (SMO), one or more network functions (NFs) hosted on at least one O-Cloud node to be migrated to one or more other O-Cloud nodes; sending, by the rApp, a recommendation to the SMO to migrate the determined one or more NFs; sending, by the SMO, instructions to implement the migration of the determined one or more NFs via an O2 interface to at least one O-Cloud management service; controlling, by the SMO, the implementation of the migration for each of the determined one or more NFs to the one or more other O-Cloud nodes; upon implementation of the migration, sending, by the at least one O-Cloud management service, a confirmation notice of the migration implementation to the SMO via the O2 interface; wherein the determining the one or more network functions NFs to be migrated, includes: obtaining, by the rApp, data referring to historical and/or current utilization patterns of at least one O-Cloud node and/or one or more NFs hosted thereon; inputting, by the rApp, the data referring to historical and/or current utilization patterns of the at least one O-Cloud node and/or the one or more NFs hosted thereon to an artificial intelligence/ machine learning (AI/ML) model; obtaining, by the rApp, a prediction of at least one utilization scenario for the at least one O-Cloud node and/or the one or more NFs hosted thereon; and determining, by the rApp, based on the prediction of the at least one utilization scenario, a migration recommendation for the one or more NFs hosted on the at least one O-Cloud node.

According to an embodiment, a non-transitory computer-readable recording medium having recorded thereon instructions executable by at least one processor configured to perform a for optimizing the scheduling of one or more open cloud (O-Cloud) nodes within an O-Cloud infrastructure of a telecommunications network, the method includes: determining, by a rApp within a service management orchestration framework (SMO), one or more network functions (NFs) hosted on at least one O-Cloud node to be migrated to one or more other O-Cloud nodes; sending, by the rApp, a recommendation to the SMO to migrate the determined one or more NFs; sending, by the SMO, instructions to implement the migration of the determined one or more NFs via an O2 interface to at least one O-Cloud management service; controlling, by the SMO, the implementation of the migration for each of the determined one or more NFs to the one or more other O-Cloud nodes; upon implementation of the migration, sending, by the at least one O-Cloud management service, a confirmation notice of the migration implementation to the SMO via the O2 interface; wherein the determining the one or more network functions NFs to be migrated, includes: obtaining, by the rApp, data referring to historical and/or current utilization patterns of at least one O-Cloud node and/or one or more NFs hosted thereon; inputting, by the rApp, the data referring to historical and/or current utilization patterns of the at least one O-Cloud node and/or the one or more NFs hosted thereon to an artificial intelligence/machine learning (AI/ML) model; obtaining, by the rApp, a prediction of at least one utilization scenario for the at least one O-Cloud node and/or the one or more NFs hosted thereon; and determining, by the rApp, based on the prediction of the at least one utilization scenario, a migration recommendation for the one or more NFs hosted on the at least one O-Cloud node.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of exemplary embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
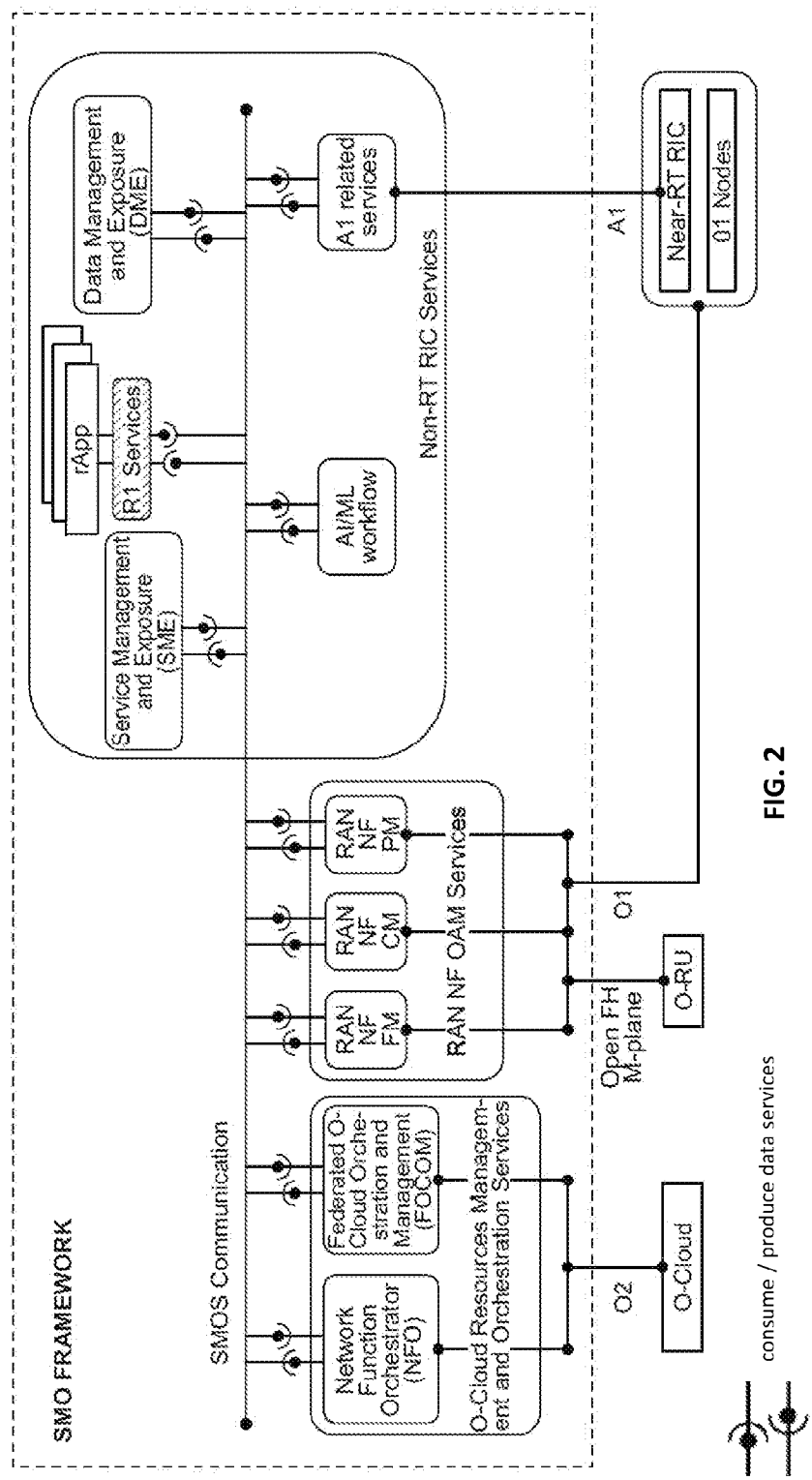
FIG. 2 illustrates a SMO framework architecture according to one or more example embodiments.

FIG. 2 illustrates a SMO framework architecture according to one or more example embodiments. In particular, FIG. 2 illustrates a NRT-RIC framework (or platform), one or more rApps hosted by the NRT-RIC with regard to an R1 interface within the SMO framework system architecture and O1, O2, A1 interfaces within an O-RAN.

Referring to FIG. 2, the NRT-RIC represents a subset of functionalities of the SMO framework. The NRT-RIC can access other SMO framework functionalities and thereby influence (i.e., controls and/or executes) what is carried across the O1 and O2 interface (e.g., performing fault management (FM), configuration management (CM) and/or performance management (PM)).

The NRT-RIC includes an NRT-RIC framework. The NRT-RIC framework, among a plurality of other functions, includes R1 service exposure functions (e.g., Service Management & Exposure (SME) functions, Data Management & Exposure (DME) functions, AI/ML Workflow functions, A1-related services functions, etc.) that handle R1 services. For example, R1 services and related service procedures may include R1-Service Management & Exposure (SME) services, R1-Data Management & Exposure (DME) services, R1-A1 services, R1-O1 Data services, R1-O2 Data services, R1-AI/ML services, etc.). Among those R1-services, for example, the DME services deliver data created or collected by data producers (e.g., a RAN NF operations, administration and maintenance (OAM) services within SMO framework) to data consumers (e.g., rApps) according to their needs (e.g., fault management (FM), consumption management (CM), production management (PM)).

To this end, the NRT-RIC framework produces and/or consumes the R1 services, wherein rApps are applications that leverage the functionalities available in the NRT-RIC framework and/or SMO framework to provide value-added services related to RAN operation and optimization. The scope of rApps includes, but is not limited to, radio resource management, data analytics, etc., and enrichment of information.

Within the NRT-RIC framework, the rApps communicate with the SMO functions via an R1 interface. The R1 interface is an open logical interface within the O-RAN architecture between the rApps and the NRT-RIC framework of the NRT-RIC. The R1 interface supports the exchange of control signaling information and the collection and delivery of data between endpoints (e.g., the rApps and one or more NFs or one or more O-Cloud nodes hosting the NFs).

Moreover, the R1 interface is independent of specific implementations of the SMO and NRT-RIC framework. The R1 interface is defined in an extensible way that enables new services and data types to be added without needing to change protocols or procedures (e.g., standardized protocols or procedures). In particular, the R1 interface facilitates the interconnection between rApps and the NRT-RIC framework supplied by different vendors (i.e., facilitates interconnection in a multi-vendor environment). To this end, the R1 interface provides a level of abstraction between the rApps and NRT-RIC framework and/or SMO framework (e.g., the NFO).

Still referring to FIG. 2, the NRT-RIC framework comprises A1-related functions. The A1-related functions communicate via the O1 interface and the A1 interface to nRT-RIC and O1 nodes (i.e., NFs such as VNF(s) and/or CNF(s) implementing O-CU, O-DU, etc.) The A1-related functions of the NRT-RIC framework support, for example, A1 logical termination, A1-policy coordination and catalog, A1-EI coordination and catalog, etc.

Moreover, within the NRT-RIC framework, the AI/ML workflow services provide access to AI/ML workflow processing. For example, the AI/ML workflow services may assist in training models, monitoring, etc. the deployed AI/ML models in NRT-RIC.

The NRT-RIC framework (e.g., the rApp) communicates (e.g., consumes or subscribes) to a plurality of SMO framework services (e.g., the SMO communicates with the NRT-RIC via an A2 interface).

For example, among others but not limited to RAN NF OAM Services that collect and (i.e., produce) OAM-related data such as fault management (FM), consumption management (CM), production management (PM), etc. from the nRT-RIC and/or O1 nodes (i.e., network NFs such as VNF(s) and/or CNF(s) implementing O-CU, O-DU, etc.). In an example embodiment, the OAM-related data are collected via the O1 interface. Alternatively, the OAM-related data may be collected via a FH M-plane interface from an O-RU.

Moreover, the NRT-RIC framework (e.g., the rApp) communicates (e.g., consumes or subscribes) to a plurality of O-Cloud Resource Management and Orchestration Services within the SMO framework. For example, among others but not limited to the SMO may include a Network Function Orchestrator (NFO), etc., that manages Virtual Machines (VM) based Virtual Network Functions (VNF) and/or could native network functions (CNF) and container (i.e., instance) based VNF and/or CNF.

In an example embodiment, the O-Cloud Resource Management and Orchestration Services may comprise services within the SMO framework that communicate via an A2 interface with the NRT-RIC.

Figure 1:
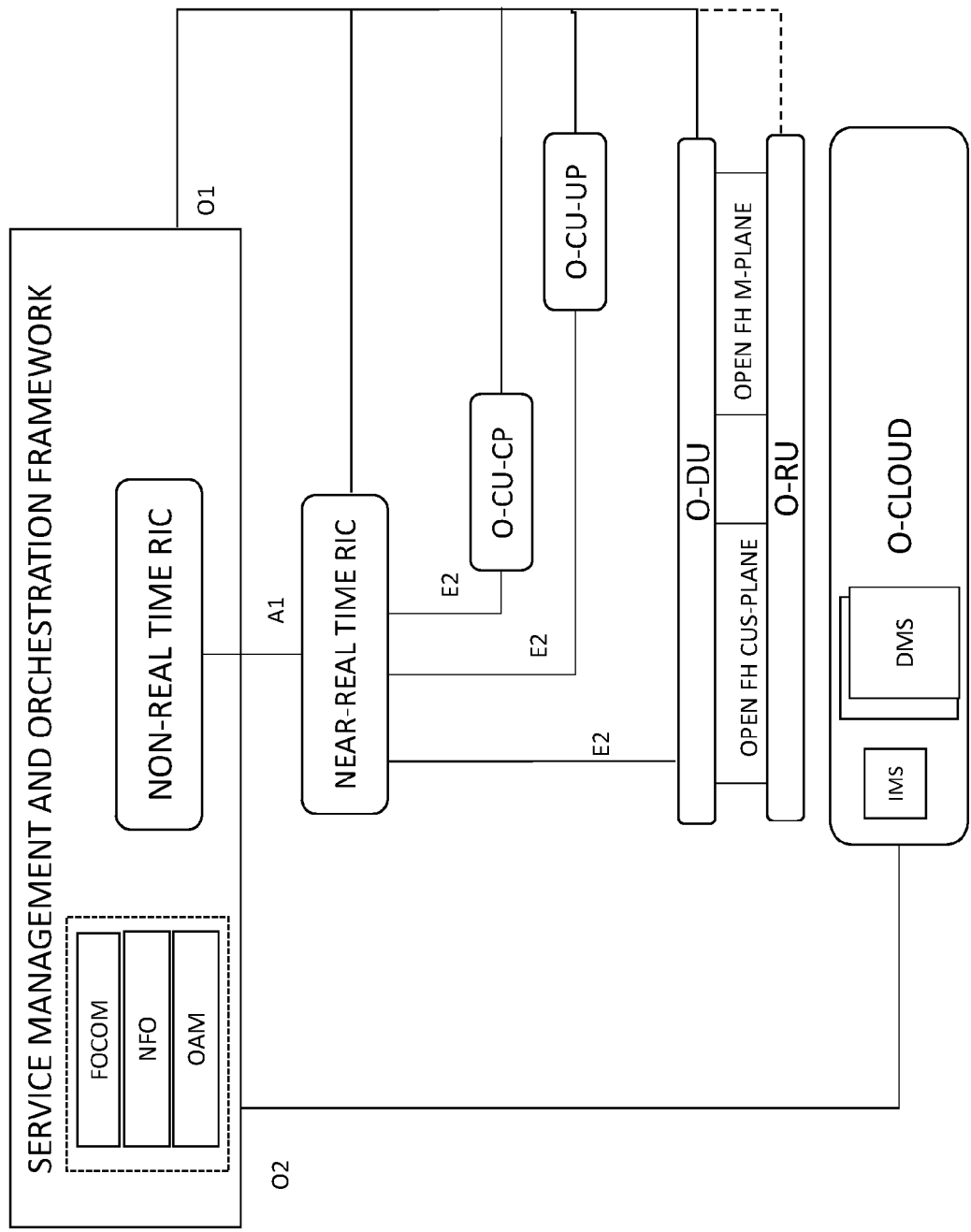
FIG. 1 illustrates an O-RAN architecture according to the related art.

In an example embodiment, the O-Cloud Resource Management and Orchestration Services may be an O2-related function that communicates via the O2 interface with O-Cloud management services such as the DMS as set forth in FIG. 1

Alternatively, the O-Cloud Resource Management and Orchestration Services may collect (i.e., produce or subscribe to)O-Cloud related performance data via other O-Cloud infrastructure performance related information channels (e.g., external services).

In an example embodiment, the rApp may collect the data referring to utilization patterns of at least one O-Cloud node and/or one or more NFs hosted thereon via a plurality of interfaces (i.e., via various subscriptions to services that to produce utilization pattern-related data via various information channels), for example, at least one of an A1-interface, an A2-interface, an O1 interface (e.g., including 3GPP interfaces such E1, F1, etc.), an O2 interface, a FH M-Plane interface, etc.

Figure 3:
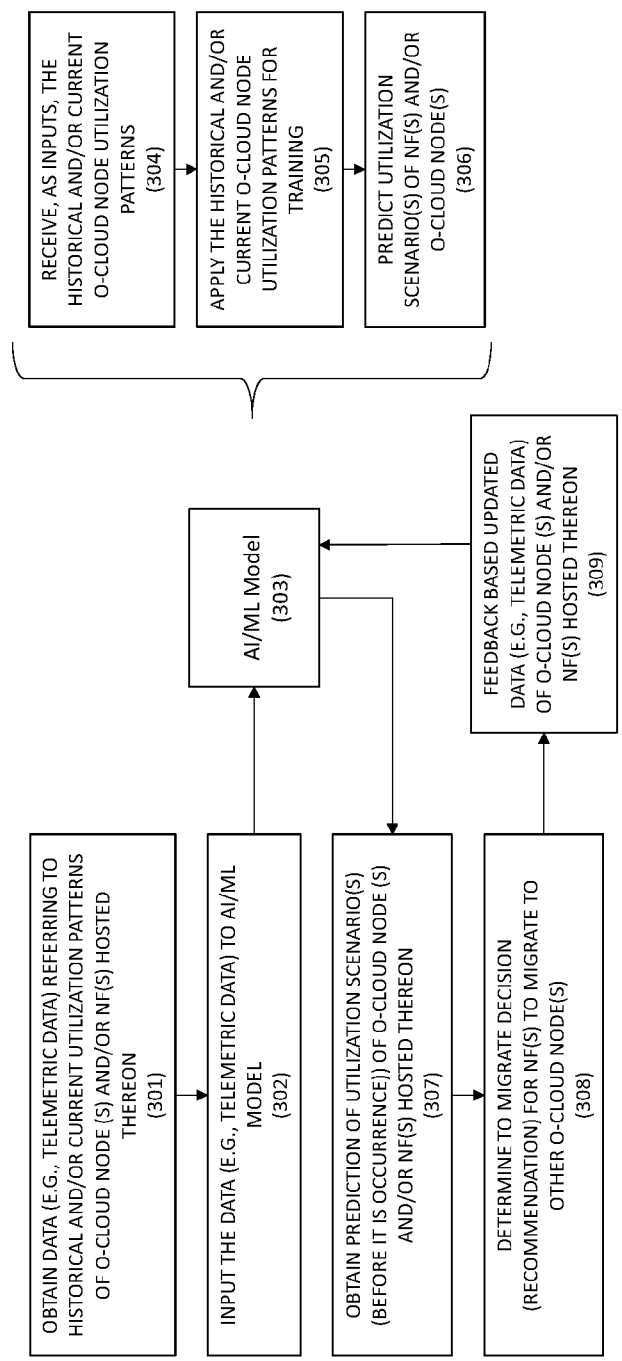
FIG. 3 illustrates a diagram of a flowchart of the method for optimizing the scheduling of one or more O-Cloud nodes according to an embodiment.

FIG. 3 illustrates a diagram of a flowchart of the method for optimizing the scheduling of one or more O-Cloud nodes according to an embodiment. Referring to FIG. 3, steps 301 to 303, 307 and 308 refer to the determination (i.e., creation of a recommendation) of whether to migrate one or more NFs hosted on one or more O-Cloud nodes to one or more other O-Cloud nodes within the O-Cloud, wherein steps 304-306 and 309 refer to the input, output, and training (e.g., reinforcement learning) of the AI/ML model by the rApp.

In step 301, the rApp collects (i.e., consumes or subscribes to services that provide) data referring to historical utilization patterns of at least one O-Cloud node and/or one or more NFs hosted thereon (e.g., the rApp may retrieve telemetric data from at least one of the interface as set forth in FIGS. 1 and 2 and/or data referring to utilization patterns that are held in DMS as set forth in FIGS. 1 and 2, etc.). For example, telemetric data, maybe stored in at least one repository of in the DMS). Alternatively, the rApp monitors and evaluates the current utilization patterns of at least one O-Cloud node or at least one NF hosted thereon (e.g., the rApp consumes life (runtime) data that refer to utilization patterns produced from the SMO framework services as set out in FIG. 2).

For example, data referring to utilization patterns of one or more NFs and/or one or more O-Cloud hosting the NFs comprise Key Performance Indicators (KPIs) (e.g., O-RAN related KPIs and/or O-Cloud related KPIs), telemetric data, topologic data (e.g., geolocations of O-RAN infrastructure (e.g., cells locations of the one or more NFs) and/or geolocations of the O-Cloud infrastructure (i.e., geolocations of O-Cloud nodes such as servers, clusters, data centers, etc. hosting the one or more NFs) retrieved via the plurality of interfaces (i.e., the information channels to produce utilization pattern related data), for example, at least one of an A1-interface, an A2-interface, an O1 interface (e.g., including 3GPP interfaces such E1, F1, etc.), an O2 interface, a FH M-Plane interface, etc.

In step 302, the rApp inputs the data referring to historical and/or current utilization patterns as set forth above to the AI/ML model.

In step 303, the AI/ML model processes the data referring to historical and/or current utilization patterns as set forth above to predict a plurality of (future) utilization scenarios of at least one O-Cloud node or one or more NFs hosted thereon.

To this end, in step 304, the AI/ML model receives, as input data for at least one of a plurality of AI/ML model algorithms, the data referring to historical and/or current utilization patterns as set forth above.

In step 305, based on the input data, at least one of the plurality of AI/ML model algorithms applies data referring to historical and/or current utilization patterns as set forth above to train the AI/ML model.

In an example embodiment, the rApp may consume data referring to historical and/or current utilization patterns produced by O2-related services via the O-Cloud DMS and inputs the data to the AI/ML model. In this case, the at least one AI/ML model algorithm may identify one or more NFs hosted on the at least O-Cloud node (e.g., one or more virtual machines (VM) based virtual network functions (VNF) and container (i.e., instance) based cloud-native network functions (CNFs)).

In this case, the input data refer to utilization patterns produced by at least one of a deployment inventory service, a deployment monitoring service, a deployment lifecycle management service, etc. Furthermore, the input data that refer to utilization patterns produced by DMS services to provision changes in the configuration of the O-Cloud and services to obtain additional information related to the O-Cloud.

In another example embodiment, the rApp may consume utilization patterns produced by O2-related services via the O-Cloud IMS. In this case, the at least one AI/ML model algorithm may identify at least one physical host (e.g., hardware infrastructure such as servers, server clusters, etc.) in the O-cloud infrastructure within the O-RAN architecture according to FIGS. 1-2 via the O2 interface. In this case, the input data refer to utilization patterns produced by an infrastructure inventory service, an infrastructure monitoring service, an infrastructure provisioning service, an infrastructure lifecycle management service, an infrastructure software management service, etc.

In step 306, the AI/ML model, based on the data referring to historical and/or current utilization patterns as set forth above, predicts at least one utilization scenario (e.g., a performance degradation, operational abnormality (e.g., unbalanced utilization of NF(s) or O-Cloud resources), etc. The prediction of at least one utilization scenario has the advantage that it may reduce alert noise (i.e., minimizes human interaction (e.g., of a could maintainer) by minimizing the number of alarms that need to be resolved by human interaction), improve resource utilization (i.e., improve energy-efficiency, balance the utilization of the O-Cloud infrastructure, etc.) and optimize the performance of the O-Cloud and the O-RAN, respectively.

In an example embodiment, in step 306, the AI/ML model, based on the data referring to historical and/or current utilization patterns as set forth above may predict the future workload and/or traffic patterns of one or more NFs within the O-RAN. As a result, based on suitable telemetry data, the prediction of data centers (i.e., one or more server clusters at a topological location within the O-RAN) hosting the one or more NFs allows for maximization of O-Cloud resource utilization and minimization of O-Cloud resource waste, respectively.

In another example embodiment, in step 306, the AI/ML model, based on the data referring to historical and/or current utilization patterns as set forth above, predicts one or more NFs to optimize their deployment in a kubernetes cluster. As a result, the prediction of the one or more allows for maximization of O-Cloud resource utilization and minimization of O-Cloud resource waste, respectively.

In another example embodiment, in step 306, the AI/ML model, based on the data referring to historical and/or current utilization patterns as set forth above, may predict (identify) the optimal locations (e.g., geolocations) for deploying one or more NFs in, for example, a server cluster, data center, etc. The optimal locations for deploying may comprise a plurality of different locations (i.e., locations that diversify the operation of the O-RAN). To this end, the prediction may be based on suitable telemetric data (e.g., location-centric data) that allow the AI-ML model to provide for a prediction of one or more NFs to be migrated (i.e., relocated). As a result, this prediction (i.e., location-centric prediction) allows a location-centric migration recommendation (i.e., a migration decision of the rApp) that enables, for example, a site-specific migration recommendation to maximize resource utilization and/or optimize the resiliency of O-RAN operations.

In another example embodiment, in step 306, the AI/ML model, based on the data referring to historical and/or current utilization patterns (e.g., telemetric data) as set forth above, predicts at least one O-Cloud nodes with a high-power usage (e.g., predicts (identifies) an unbalanced power consumption among a plurality of O-Cloud nodes in the O-Cloud infrastructure). To this end, for example, in order to ensure headroom (i.e., minimum resources for a fail-safe operation) is preserved for workloads at runtime, the prediction may be based on suitable telemetric data (e.g., power-centric data) that allow the AI-ML model to provide for a prediction of one or more NFs to be migrated (i.e., relocated) from their one more O-Cloud nodes with a high power usage to one or more other O-Cloud nodes with, for example, a low or a moderate (i.e., normal) power usage. As a result, this prediction allows a power-centric migration recommendation (i.e., a migration decision of the rApp) in order to optimize the power efficiency of the O-RAN operation.

In another example embodiment, in step 306, the AI/ML model, based on the data referring to historical and/or current utilization patterns as set forth above, predicts a performance degradation (over time and/or at a location) of at least one O-cloud node and/or one or more NFs hosted thereon. To this end, for example, in order to ensure that a robust performance of the O-RAN is preserved, the prediction may be based on suitable telemetric data that are performance-centric and allow the AI-ML model to provide for a prediction of one or more unhealthy NFs to be migrated (i.e., relocated) from their O-Cloud nodes to other O-Cloud nodes that enable the newly (i.e., re-instantiated) NFs to run in a healthy state. (i.e., instantiated new NFs on other O-Cloud nodes that are suitable to accommodate the workload of the NFs. As a result, this prediction allows a performance-centric migration recommendation (i.e., a migration decision of the rApp) in order to optimize the performance of the O-RAN operation.

In yet another example embodiment, the predictions of the AI/ML model in step 306 as set forth in above example embodiments may be combined in order to optimize the operation of the O-RAN according to the technical effects and benefits as set forth above.

According to steps 304-306, in an example embodiment, the AI/ML model (i.e., the plurality of AI/ML model algorithms) may be implemented as an integral part of the rApp according to FIG. 2. In another example embodiment, the AI/ML model may be a part of one or more of the AI/ML workflow functions of the NRT-RIC framework as illustrated in FIG. 2.

Still referring to FIG. 3, in step 307, rApp obtains (e.g., the rApp receives or processes) the at least one prediction according to at least one utilization scenario as set forth above.

In step 308, the rApp determines a migration decision (i.e., produces a recommendation to the SMO (e.g., the NFO)) for the migration of at least one NF hosted on at least one O-Cloud node. To this end, the rApp determines to migrate (or to relocate) one or more NFs to at least one other O-Cloud node (i.e., a suitable (healthy) server cluster to accommodate the one or more NFs to be migrated).

In an example embodiment, in step 309, the rApp provides, to the AI/ML model, feedback based on either data received from the SMO framework due to a decline of the migration recommendation by the SMO (i.e., NFO) or due to an update of the deployment inventory of the O-Cloud based a reconfigured O-Cloud nodes and/or one or more NFs hosted thereon after scheduling (e.g., after a migration) (i.e., feedback that is based on the data referring utilization patterns of at least one O-Cloud node and/or at least one NF hosted thereon after an inventory update). In step 309, the AI/ML model may be a reinforcement learning model configured to update the data referring to utilization patterns of the one or more NFs/O-Cloud nodes (e.g., telemetric data) based on the feedback of the rApp, wherein the feedback comprises at least one of O-Cloud node related data received over the O2 interface and/or NF related data received over an O1 interface.

Figure 4:
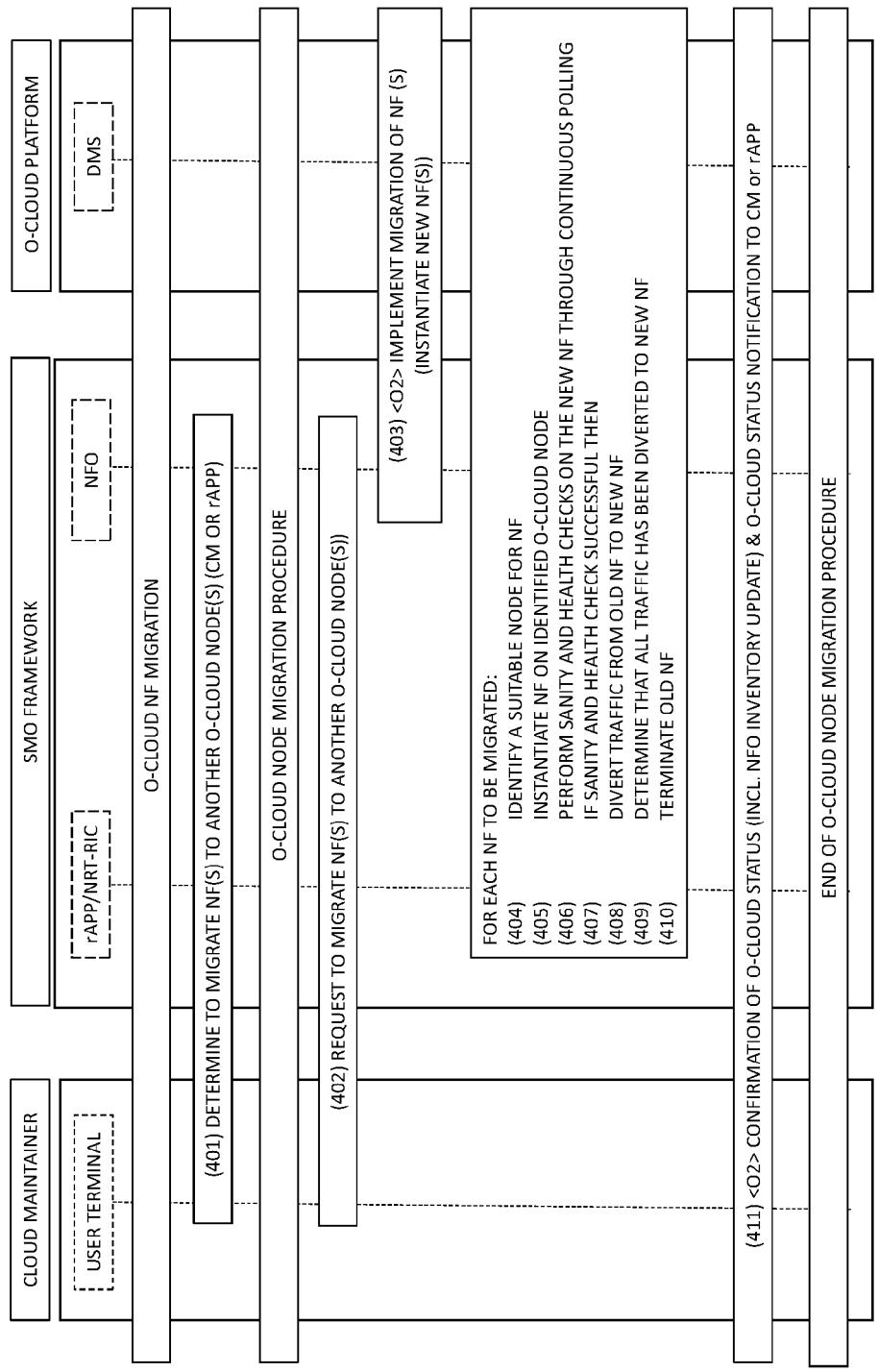
FIG. 4 illustrates a diagram of a flowchart of the method for optimizing the scheduling of one or more O-Cloud nodes according to another embodiment.

FIG. 4 illustrates a diagram of a flowchart of the method for optimizing the scheduling of one or more O-Cloud nodes according to an embodiment;

Referring to FIG. 4, in operation 401, the rApp determines to migrate (or to relocate) at least one NF to another O-Cloud node (i.e., to a suitable (healthy) server cluster to accommodate the at least one NF) based on the prediction of the at least one prediction scenario (before it is occurrence) as set forth in FIG. 3.

Alternatively, in operation 401, a user (e.g., a cloud maintainer) determines to migrate (or to relocate) the one or more NF to at least one other O-Cloud node based on the prediction of the at least one prediction scenario (before it is occurrence) as set forth in FIG. 3.

In operation 402, the rApp requests (i.e., provides a recommendation or a decision) to migrate (or to relocate) the determined one or more NFs to at least one other O-Cloud node to O-Cloud Resource Management and Orchestration Services (i.e., NFO) within SMO framework (i.e., the rApp recommends migrating the determined one or more NFs based on the AI/ML model prediction).

In operation 403, upon receiving the recommendation, the SMO (e.g., NFO) instructs to implement the migration of the determined one or more NFs in the O-Cloud (e.g., the SMO instructs the implementation to the DMS via an O2 interface). In an example embodiment, the SMO instructs the DMS to implement the migration of the determined one or more NFs.

Moreover, in operation 403, the SMO controls the implementation of the migration for each of the determined one or more NFs to the at least one other O-Cloud node, wherein for each of the determined one or more NFs, the SMO performs the following steps 404 to 410.

In operation 404, the SMO, for each NF to be migrated, identifies at least one O-Cloud node to instantiate a new NF. For example, the NFO follows (e.g., accepts) the recommendation of the rApp based on the prediction of the AI/ML model and applies the identified (i.e., determined) one or more O-Cloud nodes suitable to instantiate the new NF. In another example embodiment, the NFO may decline the recommendation of the rApp and identifies one or more other O-Cloud nodes different from the recommendation for the scheduling. In this case, the SMO provides feedback about the identified one or more O-Cloud nodes to the rApp (i.e., provides feedback about the identification to the rApp). The rApp may feedback the data received by the SMO to the AI/ML model (e.g., feedback by reinforcement learning of the AI/ML model to train at least one AI/ML model algorithm) as set out in FIG. 3.

In operation 405, the SMO instantiates the new NF on the identified one or more O-Cloud nodes (e.g., the DMS may implement the instantiation of the new NF).

In operation 406, the SMO performs a sanity and health check on the new NF, for example, based on at least one O-Cloud-related data (e.g., telemetric data) received over the O2 interface and/or O-RAN-related data (e.g., telemetric data) received over an O1 interface.

In step 407, the SMO determines that the sanity and health check on the new NF is successful. For example, the SMO runs a check of the performance of the NF and the hardware resources of the O-Cloud node hosting the NF within the O-RAN.

In operation 408, the SMO (e.g., the NFO) diverts the traffic from the NF to be migrated to the new NF.

In operation 409, the SMO determines that all traffic from the NF to be migrated is diverted to the new NF (i.e., the SMO drains the O-Cloud node hosting the NF to be migrated).

In operation 410, the SMO terminates the NF to be migrated (i.e., the old NF).

In operation 411, the O-Cloud (i.e., DMS) notifies the SMO (e.g., NFO) that the migration of the NF is completed. Moreover, in operation 411, the NFO (i.e., an O-RAN NF CM) may update the deployment inventory resource inventory. In this case, the DMS may notify the status of the reconfiguration to the NFO. Moreover, based on whether the NRT-RIC has subscribed for DMS notifications, the DMS may notify the status of the reconfiguration to the NRT-RIC. In case of a subscription of the NRT-RIC, the rApp may receive feedback (i.e., updated data referring to utilization patterns according to the new inventory after migration of one or more NFs) that may be used for the reinforcement learning/training the of the AI/ML model as set forth in FIG. 3.

Figure 5:
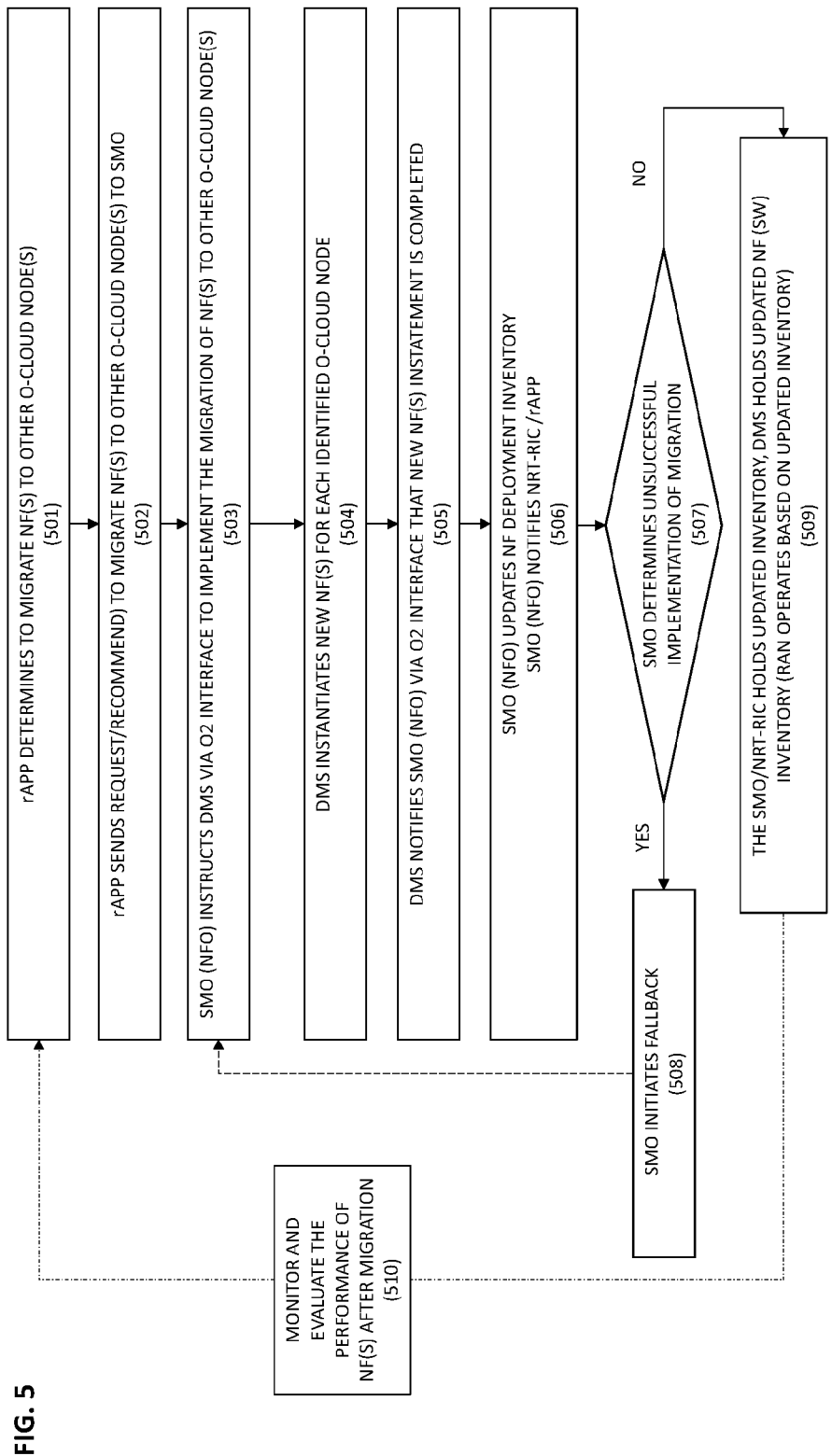
FIG. 5 illustrates a diagram of a flowchart of the method for optimizing the scheduling of one or more O-Cloud nodes according to another embodiment.

FIG. 5 illustrates a diagram of a flowchart of the method for optimizing the scheduling of one or more O-Cloud nodes according to another embodiment. Referring to FIG. 5, in step 501, the rApp determines to migrate one or more NFs to at least one other O-Cloud node (i.e., determines to migrate one or more NFs to at least one other O-Cloud node based on at least one AI/ML model prediction of at least one utilization scenario).

In step 502, the rApp sends a request (i.e., a recommendation) to migrate one or more NFs to at least one other O-Cloud node to the SMO framework (i.e., the NFO).

In step 503, the SMO (i.e., NFO) instructs the DMS (e.g., via an O2 interface) to implement the migration of the one or more NFs to one or more other O-Cloud node s.

In step 504, the DMS implement the instantiation of one or more new NFs on at least one identified O-Cloud node (i.e., the SMO instantiates the new NFs and terminates old NFs to be migrated).

In step 505, the DMS notifies the SMO (i.e., the NFO) (e.g., via the O2 interface) that the instantiation of the one or more new NFs on the at least one identified O-Cloud node is completed.

In step 506, the SMO updates the deployment inventory. To this end, the DMS may notify the status of the reconfiguration to the NFO, respectively. Moreover, based on whether the NRT-RIC has subscribed for DMS notifications, the DMS notifies the NRT-RIC. In case of a subscription of the NRT-RIC, the rApp may receive feedback (i.e., updated data referring to utilization patterns according to the new inventory after migration) that may be used for the reinforcement learning/training the of the AI/ML model as set forth in FIG. 3.

In step 507, the SMO determines whether the migration of the one or more NFs (i.e., the instantiation of the one or more new NFs) according to the recommendation of the rApp was successful or not.

In step 508, in case the SMO determines that the migration is unsuccessful (YES in step 507), the SMO initiates a fallback (i.e., initiates a fail-safe operation). For example, the SMO may request a reinstatement of the new NFs on at least one of the former O-Cloud nodes (i.e., to a state different from the recommendation of the rApp (e.g., an original state or a fail-safe state predetermined by the SMO).

In step 509, in case the SMO determines that a migration is successful (NO in step 507). In this case, the SMO holds the updated deployment inventory of the one more O-Cloud nodes and/or the one or more NFs hosted thereon (e.g., the SMO processes the deployment inventory data or stores the data in a repository to retain a data history for further processing). In this case, the rApp consumes the current and/or historic data referring to utilization patterns of the at least one O-Cloud node and/or the one or more NFs hosted thereon.

In another example embodiment, in step 509, the DMS may hold the updated deployment inventory, wherein the O-RAN operates based on the updated deployment inventory and the rApp may consume (i.e., subscribes to) the data from respective services within the SMO framework in order to obtain data to be fed back to the AI/ML model.

Moreover, in an alternative step 510 (i.e., step 309 in FIG. 3), upon the SMO holding the updated deployment inventory, the rApp may monitor and evaluate the performance of the at least one O-Cloud node and/or the one or more NFs hosted thereon after migration. To this end, based on the updated deployment inventory after migration, the rApp may collect the data referring to the utilization patterns of the one or more NFs after migration. For example, by subscribing to services (i.e., SMO functions) within the SMO framework such as O1-related services, O2-realted services, A1-related services, A2-realted services, etc. that produce telemetry data (e.g., O-RAN telemetric data via the O1 interface and/or the O-Cloud telemetric data via the O2 interface, respectively). Upon collecting, similar to step 309 in FIG. 3, the rApp feeds back data referring to the utilization patterns of performance of the at least one O-Cloud node and/or the one or more NFs hosted thereon after migration to the AI/ML model (e.g., to the one or more AI/ML model algorithms of the AI/ML model to perform steps 304 to 306 in FIG. 3 to output at least one prediction according to the utilization scenarios).

Figure 6:
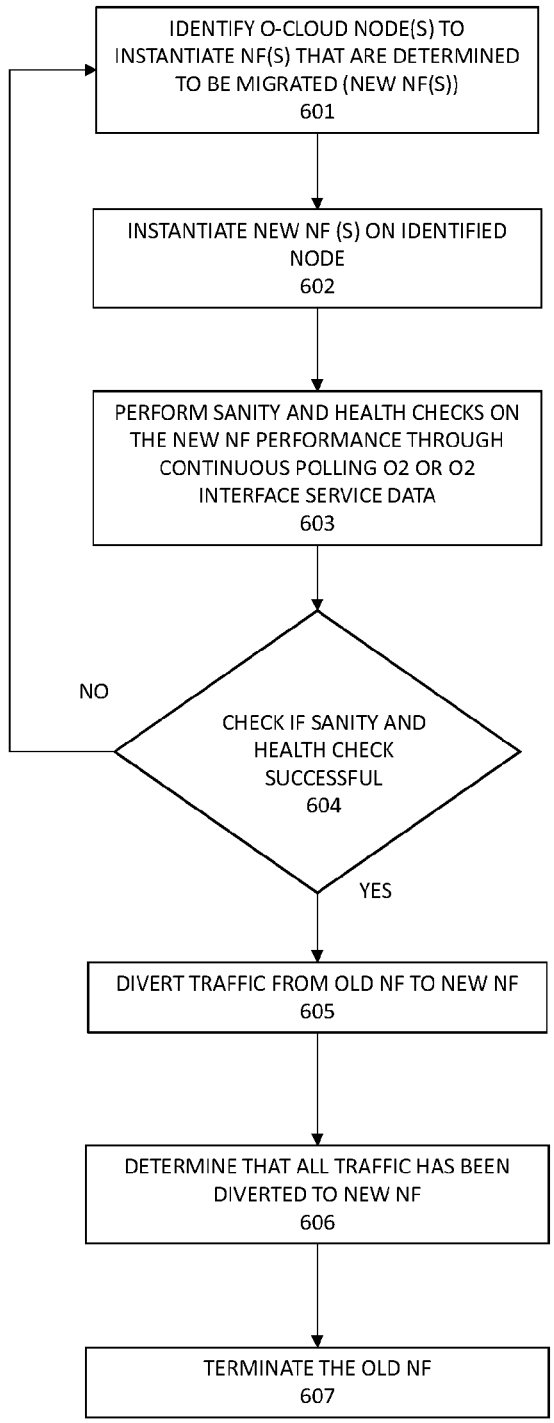
FIG. 6 illustrates a diagram of a flowchart of the method for optimizing the scheduling of one or more O-Cloud nodes according to another embodiment.

FIG. 6 illustrates a diagram of a flowchart of the method for optimizing the scheduling of one or more O-Cloud nodes according to another embodiment. Referring to FIG. 6, steps 601 to 607 refer to the operations 404 to 410 in FIG. 4 (i.e., step 504 in FIG. 5).

In step 601, for each NF to be migrated, the SMO identifies one or more O-Cloud nodes to instantiate a new NF.

In step 602, the SMO instantiates the new NF on the identified one or more O-Cloud nodes.

In step 603, the SMO performs a sanity and health check on the new NF based on at least one of O-Cloud node data received over the O2 interface (e.g., telemetric O2 interface data) and/or NF data received over an O1 interface (e.g., telemetric O1 interface data).

In step 605, the SMO determines that the sanity and health check on the new NF is successful (YES in step 604). In this case, the SMO may proceed with step 606. Alternatively, in an example embodiment, in step 604, the SMO determines that the sanity and health check on the new NF is unsuccessful (NO in step 604). In this case, the SMO may return to step 601.

In step 606, YES in step 604, the SMO of diverts the traffic from the NF to be migrated to the new NF.

In step 605, the SMO determines that all traffic from the NF to be migrated is diverted to the new NF (i.e., that the NF to be migrated is completely drained).

In step 605, the SMO terminates the NF to be migrated (i.e., the old NF).

Figure 7:
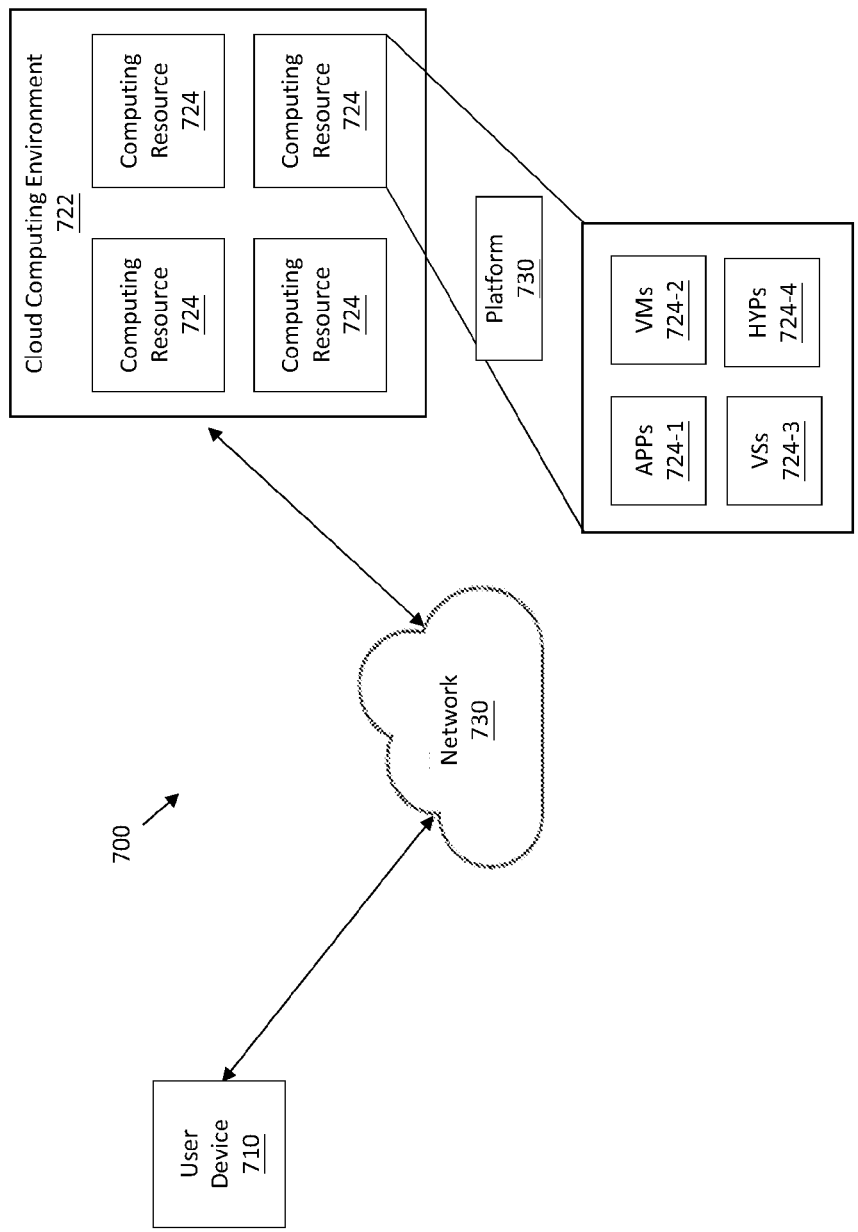
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 1 and 2 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 5. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
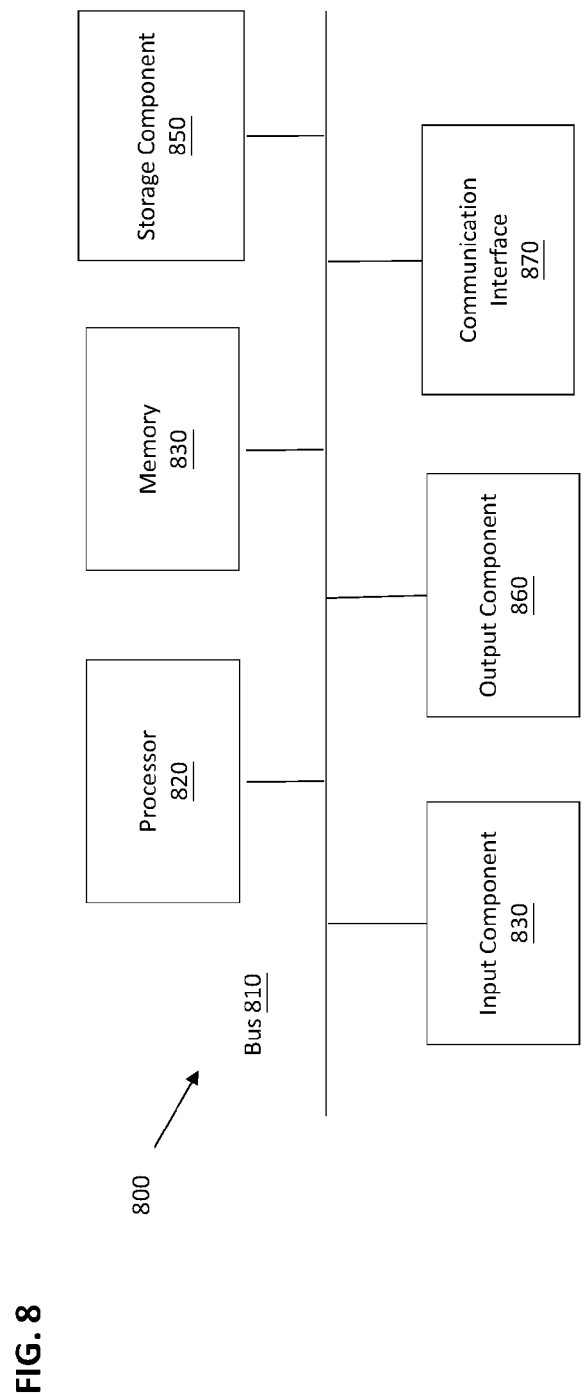
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 1 to 6 may be implemented using any of the elements illustrated in FIGS. 7 and 8.

According to an embodiment, a system for optimizing the scheduling of one or more open cloud (O-Cloud) nodes within an O-Cloud infrastructure of a telecommunications network, the system includes: at least one memory storing instructions; and at least one processor configured to execute the instructions to: determine, by a rApp within a service management orchestration framework (SMO), one or more network functions (NFs) hosted on at least one O-Cloud node to be migrated to one or more other O-Cloud nodes; send, by the rApp, a recommendation to the SMO to migrate the determined one or more NFs; send, by the SMO, instructions to implement the migration of the determined one or more NFs via an O2 interface to at least one O-Cloud management service; control, by the SMO, the implementation of the migration for each of the determined one or more NFs to the one or more other O-Cloud nodes; upon implementation of the migration, send, by the at least one O-Cloud management service, a confirmation notice of the migration implementation to the SMO via the O2 interface; wherein in determining the one or more network functions NFs to be migrated, the at least one processor is configured to execute the instructions: obtain, by the rApp, data referring to historical and/or current utilization patterns of at least one O-Cloud node and/or one or more NFs hosted thereon; input, by the rApp, the data referring to historical and/or current utilization patterns of the at least one O-Cloud node and/or the one or more NFs hosted thereon to an artificial intelligence/machine learning (AI/ML) model; obtain, by the rApp, a prediction of at least one utilization scenario for the at least one O-Cloud node and/or the one or more NFs hosted thereon; and determine, by the rApp, based on the prediction of the at least one utilization scenario, a migration recommendation for the one or more NFs hosted on the at least one O-Cloud node.

The at least one processor may be further configured to execute the instructions to: feedback, by the rApp, data referring to the data referring to historical and/or current utilization patterns of at least one O-Cloud node and/or one or more NFs hosted thereon to the AI/ML model, wherein the AI/ML model is a reinforcement learning model configured to update the data referring to historical and/or current utilization patterns of at least one O-Cloud node and/or one or more NFs hosted thereon based on the feedback; and the feedback may include at least one of O-Cloud node related data received over the O2 interface and/or one or more NF related data received over an O1 interface.

The at least one processor may be further configured to execute the instructions to: input, by the rApp, to the AI/ML model, data referring to historical and/or current utilization patterns of at least one O-Cloud node and/or one or more NFs hosted thereon; apply, by the ML model, the data referring to historical and/or current utilization patterns of at least one O-Cloud node and/or one or more NFs hosted thereon, for training for the AI/ML model based on at least one utilization scenario; predict, by the ML model, based on at least one utilization scenario trained in the AI/ML model, at least one O-cloud node and/or one or more NFs hosted thereon.

In applying the data referring to historical and/or current utilization patterns of at least one O-Cloud node and/or one or more NFs hosted thereon for training for the AI/ML model, the at least one processor may be further configured to execute the instructions to: predict, by the ML model, future workloads and/or traffic patterns of at least one O-Cloud node and/or one or more NFs hosted thereon; and identify, by the ML model, an optimal O-Cloud node for hosting the one or more NFs to be migrated based on the trained AI/ML model.

The identifying of the optimal O-Cloud node for hosting the at least one NF to be migrated based on the trained AI/ML model may include at least one optimal O-Cloud node predicted based on a location-centric utilization scenario node and/or a power consumption-centric utilization scenario.

In controlling to implement the migration for each of the determined one or more NFs to be migrated the one or more other O-Cloud nodes, the at least one processor may be further configured to execute the instructions to: identify, by the SMO, for each NF to be migrated, one or more O-Cloud nodes to instantiate a new NF; instantiate, by the SMO, the new NF on the identified one or more O-Cloud nodes; perform, by the SMO, based on at least one of O-Cloud node data received over the O2 interface and/or NF data received over an O1 interface, a sanity and health check on the new NF. determine, by the SMO, that the sanity and health check on the new NF is successful; divert, by the SMO, the traffic from the NF to be migrated to the new NF; determine, by the SMO, that all traffic from the NF to be migrated is diverted to the new NF; and terminate, by the SMO, the NF to be migrated.

In confirmation of the migration implementation, the at least one processor may be further configured to execute the instructions to: update, by the SMO, deployment inventory based on the one or more NFs after migration; send, by the at least one O-Cloud management service, an update status of the migration to at least one of the rApp, a non-real time radio intelligent controller (NRT-RIC) and a Network Function Orchestrator (NFO).

In updating deployment inventory based on the one or more NFs after migration, the at least one processor may be further configured to execute the instructions to: determine, by the SMO, that the migration has not been successful, and relocate the one or more NFs back to the at least one O-Cloud node prior to the migration recommendation.

According to an embodiment, a method for optimizing the scheduling of one or more open cloud (O-Cloud) nodes within an O-Cloud infrastructure of a telecommunications network, the method includes: determining, by a rApp within a service management orchestration framework (SMO), one or more network functions (NFs) hosted on at least one O-Cloud node to be migrated to one or more other O-Cloud nodes; sending, by the rApp, a recommendation to the SMO to migrate the determined one or more NFs; sending, by the SMO, instructions to implement the migration of the determined one or more NFs via an O2 interface to at least one O-Cloud management service; controlling, by the SMO, the implementation of the migration for each of the determined one or more NFs to the one or more other O-Cloud nodes; upon implementation of the migration, sending, by the at least one O-Cloud management service, a confirmation notice of the migration implementation to the SMO via the O2 interface; wherein the determining the one or more network functions NFs to be migrated, includes: obtaining, by the rApp, data referring to historical and/or current utilization patterns of at least one O-Cloud node and/or one or more NFs hosted thereon; inputting, by the rApp, the data referring to historical and/or current utilization patterns of the at least one O-Cloud node and/or the one or more NFs hosted thereon to an artificial intelligence/machine learning (AI/ML) model; obtaining, by the rApp, a prediction of at least one utilization scenario for the at least one O-Cloud node and/or the one or more NFs hosted thereon; and determining, by the rApp, based on the prediction of the at least one utilization scenario, a migration recommendation for the one or more NFs hosted on the at least one O-Cloud node.

The method may include: feeding back, by the rApp, data referring to the data referring to historical and/or current utilization patterns of at least one O-Cloud node and/or one or more NFs hosted thereon to the AI/ML model, wherein the AI/ML model is a reinforcement learning model configured to update the data referring to historical and/or current utilization patterns of at least one O-Cloud node and/or one or more NFs hosted thereon based on the feedback; and the feedback may include at least one of O-Cloud node related data received over the O2 interface and/or one or more NF related data received over an O1 interface.

The method may include: inputting, by the rApp, to the AI/ML model, data referring to historical and/or current utilization patterns of at least one O-Cloud node and/or one or more NFs hosted thereon; applying, by the ML model, the data referring to historical and/or current utilization patterns of at least one O-Cloud node and/or one or more NFs hosted thereon, for training for the AI/ML model based on at least one utilization scenario; predicting, by the ML model, based on at least one utilization scenario trained in the AI/ML model, at least one O-cloud node and/or one or more NFs hosted thereon.

The applying the data referring to historical and/or current utilization patterns of at least one O-Cloud node and/or one or more NFs hosted thereon for training for the AI/ML model may include: predicting, by the ML model, future workloads and/or traffic patterns of at least one O-Cloud node and/or one or more NFs hosted thereon; and identifying, by the ML model, an optimal O-Cloud node for hosting the one or more NFs to be migrated based on the trained AI/ML model.

The identifying of the optimal O-Cloud node for hosting the at least one NF to be migrated based on the trained AI/ML model may include at least one optimal O-Cloud node predicted based on a location-centric utilization scenario node and/or a power consumption-centric utilization scenario.

The controlling to implement the migration for each of the determined one or more NFs to be migrated the one or more other O-Cloud nodes may include: identifying, by the SMO, for each NF to be migrated, one or more O-Cloud nodes to instantiate a new NF; instantiating, by the SMO, the new NF on the identified one or more O-Cloud nodes; performing, by the SMO, based on at least one of O-Cloud node data received over the O2 interface and/or NF data received over an O1 interface, a sanity and health check on the new NF. determining, by the SMO, that the sanity and health check on the new NF is successful; diverting, by the SMO, the traffic from the NF to be migrated to the new NF; determining, by the SMO, that all traffic from the NF to be migrated is diverted to the new NF; and terminating, by the SMO, the NF to be migrated.

The confirmation of the migration implementation may include: updating, by the SMO, deployment inventory based on the one or more NFs after migration; sending, by the at least one O-Cloud management service, an update status of the migration to at least one of the rApp, a non-real time radio intelligent controller (NRT-RIC) and a Network Function Orchestrator (NFO).

The updating deployment inventory based on the one or more NFs after migration may include: determining, by the SMO, that the migration has not been successful, and relocating the one or more NFs back to the at least one O-Cloud node prior to the migration recommendation.

According to an embodiment, a non-transitory computer-readable recording medium having recorded thereon instructions executable by at least one processor configured to perform a for optimizing the scheduling of one or more open cloud (O-Cloud) nodes within an O-Cloud infrastructure of a telecommunications network, the method includes: determining, by a rApp within a service management orchestration framework (SMO), one or more network functions (NFs) hosted on at least one O-Cloud node to be migrated to one or more other O-Cloud nodes; sending, by the rApp, a recommendation to the SMO to migrate the determined one or more NFs; sending, by the SMO, instructions to implement the migration of the determined one or more NFs via an O2 interface to at least one O-Cloud management service; controlling, by the SMO, the implementation of the migration for each of the determined one or more NFs to the one or more other O-Cloud nodes; upon implementation of the migration, sending, by the at least one O-Cloud management service, a confirmation notice of the migration implementation to the SMO via the O2 interface; wherein the determining the one or more network functions NFs to be migrated, includes: obtaining, by the rApp, data referring to historical and/or current utilization patterns of at least one O-Cloud node and/or one or more NFs hosted thereon; inputting, by the rApp, the data referring to historical and/or current utilization patterns of the at least one O-Cloud node and/or the one or more NFs hosted thereon to an artificial intelligence/machine learning (AI/ML) model; obtaining, by the rApp, a prediction of at least one utilization scenario for the at least one O-Cloud node and/or the one or more NFs hosted thereon; and determining, by the rApp, based on the prediction of the at least one utilization scenario, a migration recommendation for the one or more NFs hosted on the at least one O-Cloud node.

The method may include: feeding back, by the rApp, data referring to the data referring to historical and/or current utilization patterns of at least one O-Cloud node and/or one or more NFs hosted thereon to the AI/ML model, wherein the AI/ML model is a reinforcement learning model configured to update the data referring to historical and/or current utilization patterns of at least one O-Cloud node and/or one or more NFs hosted thereon based on the feedback; and the feedback may include at least one of O-Cloud node related data received over the O2 interface and/or one or more NF related data received over an O1 interface.

The method may include: inputting, by the rApp, to the AI/ML model, data referring to historical and/or current utilization patterns of at least one O-Cloud node and/or one or more NFs hosted thereon; applying, by the ML model, the data referring to historical and/or current utilization patterns of at least one O-Cloud node and/or one or more NFs hosted thereon, for training for the AI/ML model based on at least one utilization scenario; predicting, by the ML model, based on at least one utilization scenario trained in the AI/ML model, at least one O-cloud node and/or one or more NFs hosted thereon.

The applying the data referring to historical and/or current utilization patterns of at least one O-Cloud node and/or one or more NFs hosted thereon for training for the AI/ML model may include: predicting, by the ML model, future workloads and/or traffic patterns of at least one O-Cloud node and/or one or more NFs hosted thereon; and identifying, by the ML model, an optimal O-Cloud node for hosting the one or more NFs to be migrated based on the trained AI/ML model.

According to embodiments the systems and methods enable the SMO (i.e., NFO) to schedule (i.e., to select) resources of the O-Cloud infrastructure in an energy-efficient, O-Cloud resource optimized manner without any performance degradation of the NFs and/or the O-Cloud nodes and thereby allow for an efficient (e.g., energy-efficient, resource optimized, etc.) operation performance of the O-RAN. As a result, the systems and methods allow a balanced resource utilization of the O-Cloud infrastructure, reduce incident reporting due to resource related alarms (e.g., minimize human interaction (e.g., of an O-Cloud maintainer)) and improve the resiliency of O-RAN operations.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A system for optimizing the scheduling of one or more open cloud (O-Cloud) nodes within an O-Cloud infrastructure of a telecommunications network, the system comprising:
   at least one memory storing instructions; and
   at least one processor configured to execute the instructions to:
   determine, by a rApp within a service management orchestration framework (SMO), one or more network functions (NFs) hosted on at least one O-Cloud node to be migrated to one or more other O-Cloud nodes;
   send, by the rApp, a recommendation to the SMO to migrate the determined one or more NFs;
   send, by the SMO, instructions to implement the migration of the determined one or more NFs via an O2 interface to at least one O-Cloud management service;
   control, by the SMO, the implementation of the migration for each of the determined one or more NFs to the one or more other O-Cloud nodes;
   upon implementation of the migration, send, by the at least one O-Cloud management service, a confirmation notice of the migration implementation to the SMO via the O2 interface;
   wherein in determining the one or more network functions NFs to be migrated, the at least one processor is configured to execute the instructions:
   obtain, by the rApp, data referring to historical and/or current utilization patterns of at least one O-Cloud node and/or one or more NFs hosted thereon;
   input, by the rApp, the data referring to historical and/or current utilization patterns of the at least one O-Cloud node and/or the one or more NFs hosted thereon to an artificial intelligence/machine learning (AI/ML) model;
   obtain, by the rApp, a prediction of at least one utilization scenario for the at least one O-Cloud node and/or the one or more NFs hosted thereon; and determine, by the rApp, based on the prediction of the at least one utilization scenario, a migration recommendation for the one or more NFs hosted on the at least one O-Cloud node.

2. The system as claimed in claim 1, wherein the at least one processor is further configured to execute the instructions to:
feedback, by the rApp, data referring to the data referring to historical and/or current utilization patterns of at least one O-Cloud node and/or one or more NFs hosted thereon to the AI/ML model,
wherein the AI/ML model is a reinforcement learning model configured to update the data referring to historical and/or current utilization patterns of at least one O-Cloud node and/or one or more NFs hosted thereon based on the feedback; and the feedback comprises
at least one of O-Cloud node related data received over the O2 interface and/or one or more NF related data received over an O1 interface.

3. The system as claimed in claim 1, wherein the at least one processor is further configured to execute the instructions to:
input, by the rApp, to the AI/ML model, data referring to historical and/or current utilization patterns of at least one O-Cloud node and/or one or more NFs hosted thereon;
apply, by the ML model, the data referring to historical and/or current utilization patterns of at least one O-Cloud node and/or one or more NFs hosted thereon, for training for the AI/ML model based on at least one utilization scenario;
predict, by the ML model, based on at least one utilization scenario trained in the AI/ML model, at least one O-cloud node and/or one or more NFs hosted thereon.

4. The system as claimed in claim 3, wherein in applying the data referring to historical and/or current utilization patterns of at least one O-Cloud node and/or one or more NFs hosted thereon for training for the AI/ML model, the at least one processor is further configured to execute the instructions to:
predict, by the ML model, future workloads and/or traffic patterns of at least one O-Cloud node and/or one or more NFs hosted thereon; and
identify, by the ML model, an optimal O-Cloud node for hosting the one or more NFs to be migrated based on the trained AI/ML model.

5. The system as claimed in claim 4, wherein the identifying of the optimal O-Cloud node for hosting the at least one NF to be migrated based on the trained AI/ML model comprises
at least one optimal O-Cloud node predicted based on a location-centric utilization scenario node and/or a power consumption-centric utilization scenario.

6. The system as claimed in claim 1, wherein in controlling to implement the migration for each of the determined one or more NFs to be migrated the one or more other O-Cloud nodes, the at least one processor is further configured to execute the instructions to:
identify, by the SMO, for each NF to be migrated, one or more O-Cloud nodes to instantiate a new NF;
instantiate, by the SMO, the new NF on the identified one or more O-Cloud nodes;
perform, by the SMO, based on at least one of O-Cloud node data received over the O2 interface and/or NF data received over an O1 interface, a sanity and health check on the new NF;
determine, by the SMO, that the sanity and health check on the new NF is successful;
divert, by the SMO, the traffic from the NF to be migrated to the new NF;
determine, by the SMO, that all traffic from the NF to be migrated is diverted to the new NF; and
terminate, by the SMO, the NF to be migrated.

7. The system as claimed in claim 1, wherein in confirmation of the migration implementation, the at least one processor is further configured to execute the instructions to:
update, by the SMO, deployment inventory based on the one or more NFs after migration;
send, by the at least one O-Cloud management service, an update status of the migration to at least one of the rApp, a non-real time radio intelligent controller (NRT-RIC) and a Network Function Orchestrator (NFO).

8. The system as claimed in claim 1, wherein in updating deployment inventory based on the one or more NFs after migration, the at least one processor is further configured to execute the instructions to:
determine, by the SMO, that the migration has not been successful, and
relocate the one or more NFs back to the at least one O-Cloud node prior to the migration recommendation.

9. A method for optimizing the scheduling of one or more open cloud (O-Cloud) nodes within an O-Cloud infrastructure of a telecommunications network, the method comprising:
determining, by a rApp within a service management orchestration framework (SMO), one or more network functions (NFs) hosted on at least one O-Cloud node to be migrated to one or more other O-Cloud nodes;
sending, by the rApp, a recommendation to the SMO to migrate the determined one or more NFs;
sending, by the SMO, instructions to implement the migration of the determined one or more NFs via an O2 interface to at least one O-Cloud management service;
controlling, by the SMO, the implementation of the migration for each of the determined one or more NFs to the one or more other O-Cloud nodes;
upon implementation of the migration, sending, by the at least one O-Cloud management service, a confirmation notice of the migration implementation to the SMO via the O2 interface;
wherein the determining the one or more network functions NFs to be migrated, comprising:
obtaining, by the rApp, data referring to historical and/or current utilization patterns of at least one O-Cloud node and/or one or more NFs hosted thereon;
inputting, by the rApp, the data referring to historical and/or current utilization patterns of the at least one O-Cloud node and/or the one or more NFs hosted thereon to an artificial intelligence/machine learning (AI/ML) model;
obtaining, by the rApp, a prediction of at least one utilization scenario for the at least one O-Cloud node and/or the one or more NFs hosted thereon; and
determining, by the rApp, based on the prediction of the at least one utilization scenario, a migration recommendation for the one or more NFs hosted on the at least one O-Cloud node.

10. The method as claimed in claim 9, wherein the method comprises:
feeding back, by the rApp, data referring to the data referring to historical and/or current utilization patterns of at least one O-Cloud node and/or one or more NFs hosted thereon to the AI/ML model, wherein the AI/ML model is a reinforcement learning model configured to update the data referring to historical and/or current utilization patterns of at least one O-Cloud node and/or one or more NFs hosted thereon based on the feedback; and the feedback comprises at least one of O-Cloud node related data received over the O2 interface and/or one or more NF related data received over an O1 interface.

11. The method as claimed in claim 9, wherein the method comprises:

inputting, by the rApp, to the AI/ML model, data referring to historical and/or current utilization patterns of at least one O-Cloud node and/or one or more NFs hosted thereon;

applying, by the ML model, the data referring to historical and/or current utilization patterns of at least one O-Cloud node and/or one or more NFs hosted thereon, for training for the AI/ML model based on at least one utilization scenario;

predicting, by the ML model, based on at least one utilization scenario trained in the AI/ML model, at least one O-cloud node and/or one or more NFs hosted thereon.

12. The method as claimed in claim 9, wherein the applying the data referring to historical and/or current utilization patterns of at least one O-Cloud node and/or one or more NFs hosted thereon for training for the AI/ML model comprises:

predicting, by the ML model, future workloads and/or traffic patterns of at least one O-Cloud node and/or one or more NFs hosted thereon; and identifying, by the ML model, an optimal O-Cloud node for hosting the one or more NFs to be migrated based on the trained AI/ML model.

13. The method as claimed in claim 12, wherein the identifying of the optimal O-Cloud node for hosting the at least one NF to be migrated based on the trained AI/ML model comprises at least one optimal O-Cloud node predicted based on a location-centric utilization scenario node and/or a power consumption-centric utilization scenario.

14. The method as claimed in claim 9, wherein the controlling to implement the migration for each of the determined one or more NFs to be migrated the one or more other O-Cloud nodes comprises:

identifying, by the SMO, for each NF to be migrated, one or more O-Cloud nodes to instantiate a new NF;

instantiating, by the SMO, the new NF on the identified one or more O-Cloud nodes;

performing, by the SMO, based on at least one of O-Cloud node data received over the O2 interface and/or NF data received over an O1 interface, a sanity and health check on the new NF;

determining, by the SMO, that the sanity and health check on the new NF is successful;

diverting, by the SMO, the traffic from the NF to be migrated to the new NF;

determining, by the SMO, that all traffic from the NF to be migrated is diverted to the new NF; and terminating, by the SMO, the NF to be migrated.

15. The method as claimed in claim 9, wherein the confirmation of the migration implementation comprises:

updating, by the SMO, deployment inventory based on the one or more NFs after migration;

sending, by the at least one O-Cloud management service, an update status of the migration to at least one of the rApp, a non-real time radio intelligent controller (NRT-RIC) and a Network Function Orchestrator (NFO).

16. The method as claimed in claim 9, wherein the updating deployment inventory based on the one or more NFs after migration comprises:

determining, by the SMO, that the migration has not been successful, and relocating the one or more NFs back to the at least one O-Cloud node prior to the migration recommendation.

17. A non-transitory computer-readable recording medium having recorded thereon instructions executable by at least one processor configured to perform a for optimizing the scheduling of one or more open cloud (O-Cloud) nodes within an O-Cloud infrastructure of a telecommunications network, the method comprising:

determining, by a rApp within a service management orchestration framework (SMO), one or more network functions (NFs) hosted on at least one O-Cloud node to be migrated to one or more other O-Cloud nodes;

sending, by the rApp, a recommendation to the SMO to migrate the determined one or more NFs;

sending, by the SMO, instructions to implement the migration of the determined one or more NFs via an O2 interface to at least one O-Cloud management service;

controlling, by the SMO, the implementation of the migration for each of the determined one or more NFs to the one or more other O-Cloud nodes;

upon implementation of the migration, sending, by the at least one O-Cloud management service, a confirmation notice of the migration implementation to the SMO via the O2 interface;

wherein the determining the one or more network functions NFs to be migrated, comprising:

obtaining, by the rApp, data referring to historical and/or current utilization patterns of at least one O-Cloud node and/or one or more NFs hosted thereon;

inputting, by the rApp, the data referring to historical and/or current utilization patterns of the at least one O-Cloud node and/or the one or more NFs hosted thereon to an artificial intelligence/machine learning (AI/ML) model;

obtaining, by the rApp, a prediction of at least one utilization scenario for the at least one O-Cloud node and/or the one or more NFs hosted thereon; and determining, by the rApp, based on the prediction of the at least one utilization scenario, a migration recommendation for the one or more NFs hosted on the at least one O-Cloud node.

18. The non-transitory computer-readable recording medium as claimed in claim 17, wherein the method comprises:

feeding back, by the rApp, data referring to the data referring to historical and/or current utilization patterns of at least one O-Cloud node and/or one or more NFs hosted thereon to the AI/ML model, wherein the AI/ML model is a reinforcement learning model configured to update the data referring to historical and/or current utilization patterns of at least one O-Cloud node and/or one or more NFs hosted thereon based on the feedback; and the feedback comprises at least one of O-Cloud node related data received over the O2 interface and/or one or more NF related data received over an O1 interface.

19. The non-transitory computer-readable recording medium as claimed in claim 17, wherein the method comprises:

inputting, by the rApp, to the AI/ML model, data referring to historical and/or current utilization patterns of at least one O-Cloud node and/or one or more NFs hosted thereon;

applying, by the ML model, the data referring to historical and/or current utilization patterns of at least one O-Cloud node and/or one or more NFs hosted thereon, for training for the AI/ML model based on at least one utilization scenario;

predicting, by the ML model, based on at least one utilization scenario trained in the AI/ML model, at least one O-cloud node and/or one or more NFs hosted thereon.

20. The non-transitory computer-readable recording medium as claimed in claim 17, wherein the applying the data referring to historical and/or current utilization patterns of at least one O-Cloud node and/or one or more NFs hosted thereon for training for the AI/ML model comprises:

predicting, by the ML model, future workloads and/or traffic patterns of at least one O-Cloud node and/or one or more NFs hosted thereon; and identifying, by the ML model, an optimal O-Cloud node for hosting the one or more NFs to be migrated based on the trained AI/ML model.

\* \* \* \* \*